US012699030B2

(12) United States Patent
Yamada

(10) Patent No.: US 12,699,030 B2
(45) Date of Patent: Aug. 4, 2026

(54) SCREENING APPARATUS FOR OPTICAL FIBER AND SCREENING METHOD FOR OPTICAL FIBER

(71) Applicant: FURUKAWA ELECTRIC CO., LTD., Tokyo (JP)

(72) Inventor: Yuki Yamada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 300 days.

(21) Appl. No.: 18/518,791

(22) Filed: Nov. 24, 2023

(65) Prior Publication Data

US 2024/0094102 A1 Mar. 21, 2024

Related U.S. Application Data

(63) Continuation of application No. PCT/JP2022/021176, filed on May 24, 2022.

(30) Foreign Application Priority Data

May 27, 2021 (JP) ................................. 2021-089567

(51) Int. Cl.
*G01N 3/08* (2006.01)
*G01M 11/08* (2006.01)
*G01N 3/02* (2006.01)

(52) U.S. Cl.
CPC .................. *G01N 3/08* (2013.01); *G01N 3/02* (2013.01)

(58) Field of Classification Search
CPC ... G01M 11/088; G01M 11/30; B65H 63/024; B65H 63/036; B65H 57/003;
(Continued)

(56) References Cited

U.S. PATENT DOCUMENTS 8,689,636 B2 4/2014 Bednarczyk et al.
2004/0155140 A1 8/2004 Mast et al.
(Continued)

FOREIGN PATENT DOCUMENTS

JP 60-179625 A 9/1985
JP 4-164228 A 6/1992
(Continued)

OTHER PUBLICATIONS

International Search Report issued Aug. 16, 2022 in PCT/JP2022/021176 filed on May 24, 2022, 3 pages.
(Continued)

*Primary Examiner* — Brandi N Hopkins
(74) *Attorney, Agent, or Firm* — Oblon, McClelland, Maier & Neustadt, L.L.P.

(57) ABSTRACT

The present invention intends to improve accuracy of screening an optical fiber. A screening apparatus for an optical fiber according to the present invention comprising: a feeding unit that feeds out an optical fiber; a tension application unit that applies a tension to the optical fiber fed out from the feeding unit; and a winding unit that winds the optical fiber to which the tension is applied by the tension application unit; wherein the tension application unit includes a first pulley, a second pulley, a first capstan, and a second capstan, a diameter of the first pulley is smaller than a diameter of the second pulley, or the diameter of the first capstan is smaller than a diameter of the second capstan.

9 Claims, 5 Drawing Sheets

(58) Field of Classification Search
CPC .... B65H 54/88; B65H 63/0321; B65H 59/38;
B65H 59/36; B65H 54/02; B65H 49/20;
B65H 49/34; B65H 63/00; B65H 63/003;
C03B 37/12; C03B 37/02736; C03B
37/032; C03B 37/0253; G01N 3/08;
G01N 3/02; G01N 3/26; Y02P 40/57;
G02B 6/02285; G02B 6/12011; G01C
25/00; B21C 1/08
See application file for complete search history.

(56)                    References Cited

U.S. PATENT DOCUMENTS

| | | | |
|---|---|---|---|
| 2015/0323434 | A1 | 11/2015 | Bumgarner et al. |
| 2016/0356669 | A1 | 12/2016 | Liu |
| 2019/0010013 | A1* | 1/2019 | Suzuki ................. G02B 6/4458 |
| 2020/0011763 | A1 | 1/2020 | Suzuki |

FOREIGN PATENT DOCUMENTS

| | | | |
|---|---|---|---|
| JP | 11-83672 | A | 3/1999 |
| JP | 2017-521340 | A | 8/2017 |
| JP | 2018-528392 | A | 9/2018 |
| JP | 2018-173382 | A | 11/2018 |
| WO | WO 2017/159848 | A1 | 9/2017 |

OTHER PUBLICATIONS

Office Action issued Apr. 10, 2026, in Indian Patent Application No.
202347087129, with English translation thereof, 8 pages.

\* cited by examiner

SCREENING APPARATUS FOR OPTICAL FIBER AND SCREENING METHOD FOR OPTICAL FIBER

CROSS-REFERENCE TO RELATED APPLICATIONS

This application is a continuation application of International Application No. PCT/JP2022/21176, filed May 24, 2022, which claims the benefit of Japanese Patent Application No. 2021-089567, filed May 27, 2021, both of which are hereby incorporated by reference herein in their entirety.

BACKGROUND OF THE INVENTION

Field of the Invention

The present invention relates to a screening apparatus for an optical fiber and a screening method for the optical fiber.

Description of the Related Art

When an optical fiber has a low strength part where the strength is low due to a contamination of foreign matter, a flaw, a defect, or the like, disconnection may occur for the low strength part. Accordingly, a screening test is performed on a drawn optical fiber by applying a predetermined tension to test the tensile strength performance thereof. A screening test may be continuously performed directly on the optical fiber drawn by a manufacturing line by using a screening apparatus directly connected to a manufacturing line of the optical fiber, or may be performed on an optical fiber wound around a bobbin after drawing. With an optical fiber being subjected to such a screening test, the life regarding disconnection of an optical fiber is ensured. For example, Patent Literature 1 discloses a screening apparatus in which a pulley is obliquely installed to give strain to multiple side surfaces of an optical fiber.

Further, the factors causing the strength degradation in the optical fiber are not only the contamination of foreign matter, foam, scratch, and the like. Usually, a cover layer made of a resin having ultraviolet curing properties is formed on a glass portion of the optical fiber. When curing is performed in a state where foreign matter is mixed in the coating resin forming the coating layer, the glass portion of the optical fiber may be damaged by the foreign matter when the optical fiber is wound around a bobbin or the like, and the strength may be degraded.

CITATION LIST

Patent Literature

Patent Literature 1: Patent Application Laid-Open No. H11-83672.

SUMMARY OF THE INVENTION

Technical Problem

As in the conventional screening device, in a method of applying tensile strength to an optical fiber, the optical fiber receives tensile stress only in the longitudinal direction. However, in the case where a foreign matter exists in the coating resin of the optical fiber, the glass portion in the resin is hardly damaged even when a tensile stress is applied, and therefore, it is difficult to reliably break the optical fiber at a portion where the foreign matter exists.

The present invention has been made in view of the above and intends to provide a screening apparatus for an optical fiber and a screening method for the optical fiber that can improve accuracy of screening the optical fiber.

Solution to the Problem

According to one aspect of the present invention, provided is a screening apparatus for an optical fiber including: a feeding unit that feeds out an optical fiber; a tension application unit that applies a tension to the optical fiber fed out from the feeding unit; and a winding unit that winds the optical fiber to which the tension is applied by the tension application unit; wherein the tension application unit includes a first pulley, a second pulley, a first capstan, and a second capstan, a diameter of the first pulley is smaller than a diameter of the second pulley, or the diameter of the first capstan is smaller than a diameter of the second capstan.

According to another aspect of the present invention, provided is a screening method for an optical fiber including: feeding out an optical fiber from a feeding unit; by using a tension application unit, applying a tension to the optical fiber fed out from the feeding unit; and by using a winding unit, winding the optical fiber to which the tension is applied by the tension application unit, wherein the tension application unit includes a first pulley, a second pulley, a first capstan, and a second capstan, a diameter of the first pulley is smaller than a diameter of the second pulley, or the diameter of the first capstan is smaller than a diameter of the second capstan.

Advantageous Effects of Invention

According to the present invention, accuracy of screening for an optical fiber can be improved.

DESCRIPTION OF EMBODIMENTS

First Embodiment

Figure 1:
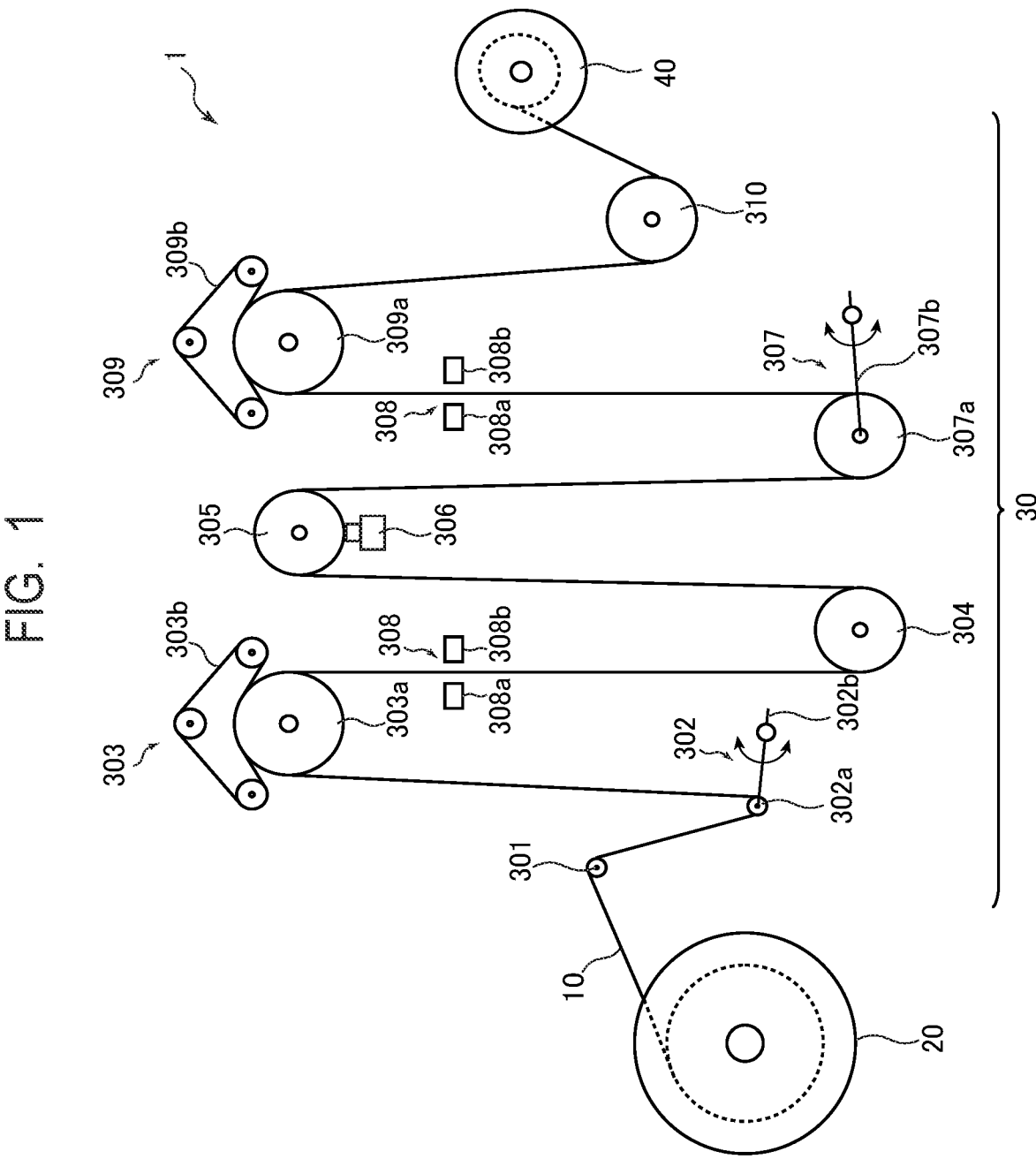
FIG. 1 is a schematic diagram illustrating a screening apparatus for an optical fiber according to a first embodiment of the present invention.

A screening apparatus for an optical fiber and a screening method for an optical fiber according to a first embodiment of the present invention will be described by using FIG. 1 and FIG. 2.

First, a configuration of a screening apparatus 1 for an optical fiber 10 according to the present embodiment will be described by using FIG. 1 and FIG. 2. FIG. 1 is a schematic diagram illustrating the screening apparatus 1 for the optical fiber 10 according to the present embodiment. FIG. 2 is a block diagram illustrating the screening apparatus 1 for the optical fiber 10 according to the present embodiment.

The screening apparatus 1 for the optical fiber 10 according to the present embodiment is an apparatus that performs a screening test for testing a tensile strength performance of the optical fiber 10. As illustrated in FIG. 1, the screening apparatus 1 has a feeding bobbin 20, a tension application unit 30, and a winding bobbin 40. In the tension application unit 30, a pulley 301, a feeding dancer 302, the first capstan 303, a pulley 304, a pulley 305, a screening dancer 307, the second capstan 309, and a pulley 310 are provided in this order from the upstream side to the downstream side of the screening apparatus 1.

Around the feeding bobbin 20, an optical fiber 10 to be subjected to a screening test is wound. The feeding bobbin 20 is adapted to be rotary-driven by a servomotor 52 (see FIG. 2) in a direction in which the optical fiber 10 is fed out. Thereby, the feeding bobbin 20 functions as a feeding unit that feeds the optical fiber 10 toward the tension application unit 30.

Between the feeding bobbin 20 and the first capstan 303, a pulley 301 and a pulley 302*a* are provided in this order from the upstream side to the downstream side of the screening apparatus 1. The pulley 302*a* is a pulley of the feeding dancer 302. The diameters of the pulley 301 and the pulley 302*a* are smaller than the diameters of other pulleys described later. In the present embodiment, the diameters of the pulley 301 and the pulley 302*a* are 20 mm. In this specification, a pulley having a diameter smaller than the diameter of the normal size is also referred to as a "small-diameter pulley" or a "first pulley". On the other hand, a pulley having a diameter of the normal size is also referred to as a "normal pulley" or a "second pulley".

When the optical fiber 10 is conveyed, the pulley 301 and the pulley 302*a* are driven and rotated by a force received from the optical fiber 10. The feeding bobbin 20, the pulley 301, the pulley 302*a*, and the first capstan roller 303*a* each have a horizontal rotation axis. The rotation axes of the feeding bobbin 20, the pulley 301, the pulley 302*a*, and the first capstan roller 303*a* are in parallel to each other.

The pulley 301 is arranged higher than the feeding bobbin 20. The pulley 302*a* is arranged lower than the pulley 301. The first capstan 303 is arranged higher than the pulley 301 and the pulley 302*a*. Further, the first capstan 303 is arranged substantially the same height as the second capstan 309.

In this way, the feeding bobbin 20, the pulley 301, the pulley 302*a*, and the first capstan 303 are arranged from the upstream side to the downstream side of the screening apparatus 1 in a zigzag manner in a vertical direction. The optical fiber 10 fed out from the feeding bobbin 20 is wound around and hung on the pulley 301, the pulley 302*a*, and the first capstan 303 in a zigzag manner in this order.

The feeding dancer 302 has the pulley 302*a* and a bar-like support member 302*b* to which the pulley 302*a* is attached at a tip part in a rotatable manner. A base portion of the support member 302*b* has a rotary axis parallel to the rotation axis of the pulley 302*a*, and the support member 302*b* can revolve about the rotary axis. The pulley 302*a* moves up and down in response to revolution of the support member 302*b*. In such a way, on the feeding side of the optical fiber 10, the tension applied to the optical fiber 10 is adjusted by the pulley 302*a* of the feeding dancer 302 moving vertically. Note that, it is preferable that a strike-prevention plate for preventing occurrence of a fiber-strike on the feeding bobbin 20 side are provided between the feeding bobbin 20 and the pulley 301.

The first capstan 303 is adapted to be rotary-driven by a servomotor 54 (see FIG. 2) to feeds the optical fiber 10 fed from the feeding bobbin 20 from the upstream side to the downstream side of the screening apparatus 1.

The first capstan 303 has a first capstan roller 303*a* and a rotatable first endless belt 303*b*. The first endless belt 303*b* is pressed to the first capstan roller 303*a*. The first endless belt 303*b* is adapted to rotate in an opposite direction to the rotation direction of the first capstan roller 303*a* in response to the rotation of the first capstan roller 303*a*. While being interposed between the first capstan roller 303*a* and the first endless belt 303*b*, the optical fiber 10 is fed out by the rotation of the first capstan roller 303*a*.

A pulley 304, a pulley 305, and a pulley 307*a* are arranged downstream of the first capstan 303. The pulley 307*a* is a pulley of the screening dancer 307. The pulley 304, the pulley 305, and the pulley 307*a* are provided in this order from the upstream side to the downstream side of the screening apparatus 1. The pulley 304, the pulley 305, and the pulley 307*a* each have a horizontal rotation axis. The rotation axes of the pulley 304, the pulley 305, and the pulley 307*a* are in parallel to each other and parallel to the rotation axis of the first capstan roller 303*a*.

In the first capstan 303, a rotation number counter 62 (see FIG. 2) that measures the rotation number (rotation speed) of the first capstan roller 303*a* is provided. The rotation number counter 62 measures the rotation number of the first capstan roller 303*a* while performing a screening test and outputs a measurement signal in accordance with the measured rotation number.

The diameters of the pulley 304, the pulley 305, and the pulley 307*a* are normal sizes. In the present embodiment, the diameters of the pulley 304, the pulley 305, and the pulley 307*a* are 100 mm.

The pulley 304 is arranged lower than the first capstan 303. The pulley 305 is arranged higher than the pulley 304 and pulley 307*a*. The pulley 305 is arranged substantially the same height as the first capstan 303 and the second capstan 309 that are arranged at substantially the same height. In such a way, the pulley 304, the pulley 305, and the pulley 307*a* are arranged from the upstream side to the downstream side of the screening apparatus 1 in a zigzag manner in a vertical direction. The optical fiber 10 fed out from the first capstan 303 is wound around and hung on the pulley 304, the pulley 305, and the pulley 307*a* in a zigzag manner in this order.

The screening dancer 307 has the pulley 307*a* and a bar-like support member 307*b* to which the pulley 307*a* is attached at a tip part in a rotatable manner. A base portion of the support member 307*b* has a rotary axis parallel to the rotation axis of the pulley 307*a*, and the support member 307*b* can revolve about the rotary axis. The pulley 307*a* moves up and down in response to revolution of the support member 307*b*. In such a way, the screening dancer 307 is adapted to apply a certain tension to the optical fiber 10 by the weight of the pulley 307*a* moving vertically.

A tensiometer 306 that measures a tension of an optical fiber 10 wound around and hung on the pulley 305 is provided to the pulley 305. As the tensiometer 306, a load cell is used, for example. The tensiometer 306 measures the tension of the optical fiber 10 while performing a screening test and outputs a measurement signal in accordance with the measured tension. The vertical motion of the pulley 307*a* by the screening dancer 307 is controlled so that the tension measured by the tensiometer 306 is constant.

A disconnection sensor 308 that detects occurrence of disconnection of the optical fiber 10 are provided on the conveyance path of the optical fiber 10 in the screening apparatus 1. The disconnection sensor 308 is of an optical type, for example, and has a light source unit 308*a* and a light receiving unit 308*b* arranged on both sides of the optical fiber 10. The disconnection sensor 308 detects occurrence of disconnection of the optical fiber 10 based on a change in a light receiving amount at the light receiving unit 308*b* that receives a light emitted from the light source unit 308*a*. The disconnection sensor 308 outputs a detection signal in response to detecting occurrence of disconnection of the optical fiber 10.

In the present embodiment, the disconnection sensor 308 is provided near the first capstan 303 between the first capstan 303 and the pulley 304. Further, for example, the disconnection sensor 308 is provided near the second capstan 309 and between the pulley 307*a* of the screening dancer 307 and the second capstan 309.

Note that the disconnection sensor 308 is not limited to the optical type disconnection sensor. As the disconnection sensor 308, other than the optical disconnection sensor, various types of the disconnection sensors such as a contact type disconnection sensor can be used.

Further, while FIG. 1 illustrates the case where two disconnection sensors 308 are provided on the conveyance path of the optical fiber 10, the number of the disconnection sensor 308 is not limited thereto. At least one or more disconnection sensor 308 may be provided. Further, the position where the disconnection sensor 308 is provided in the apparatus may be changed as appropriate.

The second capstan 309 is provided on the downstream side of the screening dancer 307. The second capstan 309 is arranged higher than the screening dancer 307. The optical fiber 10 fed from the screening dancer 307 is wound around and hung on and over a second capstan roller 309*a*.

The second capstan 309 has the second capstan roller 309*a* and a rotatable second endless belt 309*b*. The second capstan roller 309*a* is adapted to be rotary-driven by a servomotor 58 (see FIG. 2) to feeds the optical fiber 10 from the upstream side to the downstream side of the screening apparatus 1. The second capstan roller 309*a* has a horizontal rotation axis. The rotation axis of the second capstan roller 309*a* is parallel to the rotation axis of the first capstan roller 303*a*.

The second endless belt 309*b* is pressed to the second capstan roller 309*a*. The second endless belt 309*b* is adapted to rotate in an opposite direction to the rotation direction of the second capstan roller 309*a* in response to the rotation of the second capstan roller 309*a*. While being interposed between the second capstan roller 309*a* and the second endless belt 309*b*, the optical fiber 10 is fed out by the rotation of the second capstan roller 309*a*.

Between the second capstan 309 and the winding bobbin 40, a pulley 310 is provided. The pulley 310 has a horizontal rotation axis. Further, the rotation axis is parallel to the rotation axis of the second capstan roller 309*a*. Further, in the present embodiment, the diameter of the pulley 310 is 100 mm, which is the normal size, similarly to the diameters of the pulley 304, the pulley 305, and the pulley 307*a*.

One end of the optical fiber 10 wound around and hung on the pulley 310 is fixed to the winding bobbin 40 so that the optical fiber 10 is wound by the winding bobbin 40. Note that, between the pulley 310 and the winding bobbin 40, a strike-prevention plate (Not shown) for preventing occurrence of a fiber-strike on the winding bobbin 40 side may be provided.

The winding bobbin 40 is for winding the optical fiber 10 to which a tension is applied by the tension application unit 30 and which has been subjected to a screening test. The winding bobbin 40 is adapted to be rotary-driven in a direction in which the optical fiber 10 is wound by a servomotor 60 (see FIG. 2). Thereby, the winding bobbin 40 functions as a winding unit that winds the optical fiber 10 to which tension is applied by the tension application unit 30 and whose screening test is completed.

Figure 2:
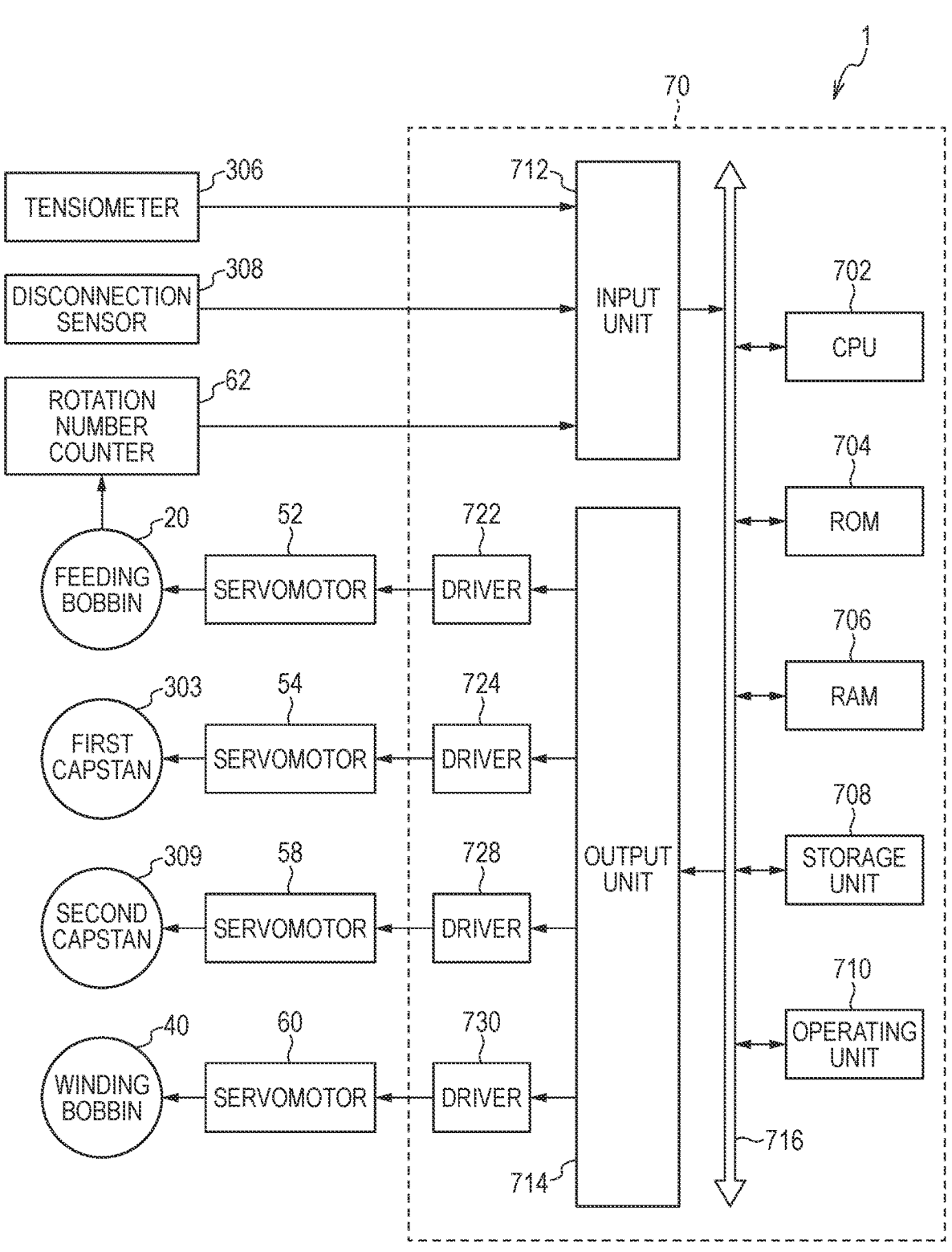
FIG. 2 is a block diagram illustrating the screening apparatus for the optical fiber according to the first embodiment of the present invention.

As illustrated in FIG. 2, the screening apparatus 1 according to the present embodiment has the servomotor 52 that rotary-drives the feeding bobbin 20 and the servomotor 54 that rotary-drives the first capstan 303 (first capstan roller 303*a*). Further, the screening apparatus 1 according to the present embodiment has the servomotor 58 that rotary-drives the second capstan 309 (second capstan roller 309*a*) and the servomotor 60 that rotary-drives the winding bobbin 40.

Further, the screening apparatus 1 according to the present embodiment has a control unit 70 that controls the entire operation of the screening apparatus 1. The control unit 70 has a central processing unit (CPU) 702, a read only memory (ROM) 704, a random access memory (RAM) 706, a storage unit 708, and an operating unit 710. Further, the screening apparatus 1 according to the present embodiment has an input unit 712 and an output unit 714. The CPU 702, the ROM 704, the RAM 706, the storage unit 708, the operating unit 710, the input unit 712, and the output unit 714 are connected to a common bus 716.

The control unit 70 further has a driver 722 used for driving the servomotor 52, a driver 724 used for driving the servomotor 54, a driver 728 used for driving the servomotor 58, and a driver 730 used for driving the servomotor 60. The drivers 722, 724, 728, and 730 are connected to the output unit 714, respectively. The output unit 714 performs signal processing such as digital-to-analog (D/A) conversion on a control signal output from the CPU 702 and outputs the control signal to the drivers 722, 724, 728, and 730 in a processable manner.

The tensiometer 306 is connected to the input unit 712. Further, the disconnection sensor 308 is connected to the input unit 712. Further, the rotation number counter 62 is connected to the input unit 712. The input unit 712 performs signal processing such as analog-to-digital (A/D) conversion on signals input to the control unit 70 from the tensiometer 306, the disconnection sensor 308, and the rotation number counter 62 and enables processing of these signals in the control unit 70.

The CPU 702 executes a control program and controls the entire operation of the screening apparatus 1. The ROM 704 stores a control program executed by the CPU 702. The RAM 706 is used as a working area when the CPU 702 executes the control program. The storage unit 708 stores various data to which the CPU 702 refers when executing the control program. Further, an operator can perform various settings on a screening test or can input an instruction of execution of the screening test via the operating unit 710.

The CPU 702 performs control for rotary-driving the feeding bobbin 20, the first capstan 303, the second capstan 309, and the winding bobbin 40 when performing a screening test.

Specifically, the CPU 702 outputs a rotation instruction signal, which is a control signal for instructing rotary drive of the servomotor 52, to the driver 722 via the output unit 714. The driver 722 outputs, to the servomotor 52, a drive signal that rotary-drives the servomotor 52 based on the rotation instruction signal input from the CPU 702. In response to the drive signal being input from the driver 722 to the servomotor 52, the servomotor 52 rotates. In response to rotation of the servomotor 52, the feeding bobbin 20 rotates, and the optical fiber 10 is fed out from the feeding bobbin 20 around which the optical fiber 10 has been wound.

Further, the CPU 702 outputs a rotation instruction signal, which is a control signal for instructing rotary drive of the servomotor 54, to the driver 724 via the output unit 714. The driver 724 outputs, to the servomotor 54, a drive signal that rotary-drives the servomotor 54 based on the rotation instruction signal input from the CPU 702. In response to the drive signal being input from the driver 724 to the servomotor 54, the servomotor 54 rotates. In response to rotation of the servomotor 54, the first capstan 303 rotates, and the optical fiber 10 is fed to the downstream side.

Further, the CPU 702 outputs a rotation instruction signal, which is a control signal for instructing rotary drive of the servomotor 58, to the driver 728 via the output unit 714. The driver 728 outputs, to the servomotor 58, a drive signal that rotary-drives the servomotor 58 based on the rotation instruction signal input from the CPU 702. In response to the drive signal being input from the driver 728 to the servomotor 58, the servomotor 58 rotates. In response to rotation of the servomotor 58, the second capstan 309 rotates, and the optical fiber 10 is fed to the downstream side.

Further, the CPU 702 outputs a rotation instruction signal, which is a control signal for instructing rotary drive of the servomotor 60, to the driver 730 via the output unit 714. The driver 730 outputs, to the servomotor 60, a drive signal that rotary-drives the servomotor 60 based on the rotation instruction signal input from the CPU 702. In response to the drive signal being input from the driver 730 to the servomotor 60, the servomotor 60 rotates. In response to rotation of the servomotor 60, the winding bobbin 40 rotates, and the optical fiber 10 to which a tension is applied by the tension application unit 30 is wound around by the winding bobbin 40.

As described above, in a screening test, each of the feeding bobbin 20, the first capstan 303, the second capstan 309, and the winding bobbin 40 rotates. Thereby, the optical fiber 10 fed out from the feeding bobbin 20 is conveyed at a constant drawing speed on a path through the first capstan 303, the pulley 304, the pulley 305, the pulley 307a and the second capstan 309 in this order. Meanwhile, a constant tension is applied to the optical fiber 10 by the screening dancer 307.

The CPU 702 controls the operation of the screening dancer 307 so that the tension measured by the tensiometer 306 is constant based on a measurement signal input from the tensiometer 306 via the input unit 712.

When there is a low strength part in the optical fiber 10 to which a constant tension is applied in the tension application unit 30, the optical fiber 10 is broken and disconnected at the low strength part due to the tension applied by the 30. The low strength part of the optical fiber 10 is generated due to a contamination of foreign matter, a flaw, a defect, or the like of the optical fiber 10.

The occurrence of disconnection of the optical fiber 10 is detected by the disconnection sensor 308. In response to the detection of the occurrence of disconnection of the optical fiber 10, the disconnection sensor 308 outputs a detection signal. The detection signal output from the disconnection sensor 308 is input to the CPU 702 via the input unit 712.

Once the detection signal is input from the disconnection sensor 308, the CPU 702 controls the feeding bobbin 20, the first capstan 303, the second capstan 309, and the winding bobbin 40 to stop each rotation thereof. In such a way, upon the detection of the occurrence of disconnection of the optical fiber 10, the CPU 702 performs control to stop transporting the optical fiber 10.

Specifically, the CPU 702 outputs a stop instruction signal, which is a control signal for instructing stop of the rotary drive of the servomotor 52, to the driver 722 via the output unit 714. The driver 722 outputs, to the servomotor 52, a stop signal that stops the rotary drive of the servomotor 52 based on the stop instruction signal input from the CPU 702. In response to the stop signal being input from the driver 722 to the servomotor 52, stop of rotary drive of the servomotor 52 is instructed.

As described above, according to the present embodiment, the tension application unit 30 includes the pulley 301 and the pulley 302a whose diameters are smaller than those of the normal pulleys. Therefore, the bending angle is larger when the optical fiber 10 is wound around the pulley 301 and the pulley 302a than when the optical fiber 10 is wound around the other four normal pulleys (the pulley 304, the pulley 305, the pulley 307a, and the pulley 310). Thereby, it is possible to reliably break the optical fiber 10 in a portion where the strength degradation occurs in the optical fiber 10. As a result, the occurrence of breaking of the optical fiber 10 in the subsequent process can be reduced.

Usually, a covering layer made of a resin is formed on the outer peripheral portion of the optical fiber 10. When a foreign matter is mixed in the coating layer, strength degradation occurs at a portion where the foreign matter exists. However, in the conventional apparatus in which tension is applied by using a plurality of pulleys having the same diameter, even if tension is applied to the optical fiber 10 in which foreign matter exists in the covering layer while bending, the glass portion inside the optical fiber 10 may not be damaged and may not be broken.

On the other hand, according to the screening apparatus 1 of the present embodiment, since a pulley having a smaller diameter than the normal pulley is used, the bending angle can be increased. Thereby, it is possible to reliably break the optical fiber 10 at the position of the foreign matter even in the optical fiber 10 in which the foreign matter exists in the covering layer. That is, it is possible to improve accuracy of screening for the optical fiber 10.

Further, in the present embodiment, in the conveyance direction of the optical fiber 10, the pulley 301, which is a small-diameter pulley (first pulley), is arranged upstream of the pulley 304, which is a normal pulley (second pulley), and other rotating members (the first capstan 303 and the second capstan 309). Thereby, the tension can be applied at a larger bending angle on the upstream side in the conveyance direction of the optical fiber 10, which is different from the bending angle on the downstream side.

Second Embodiment

Figure 3:
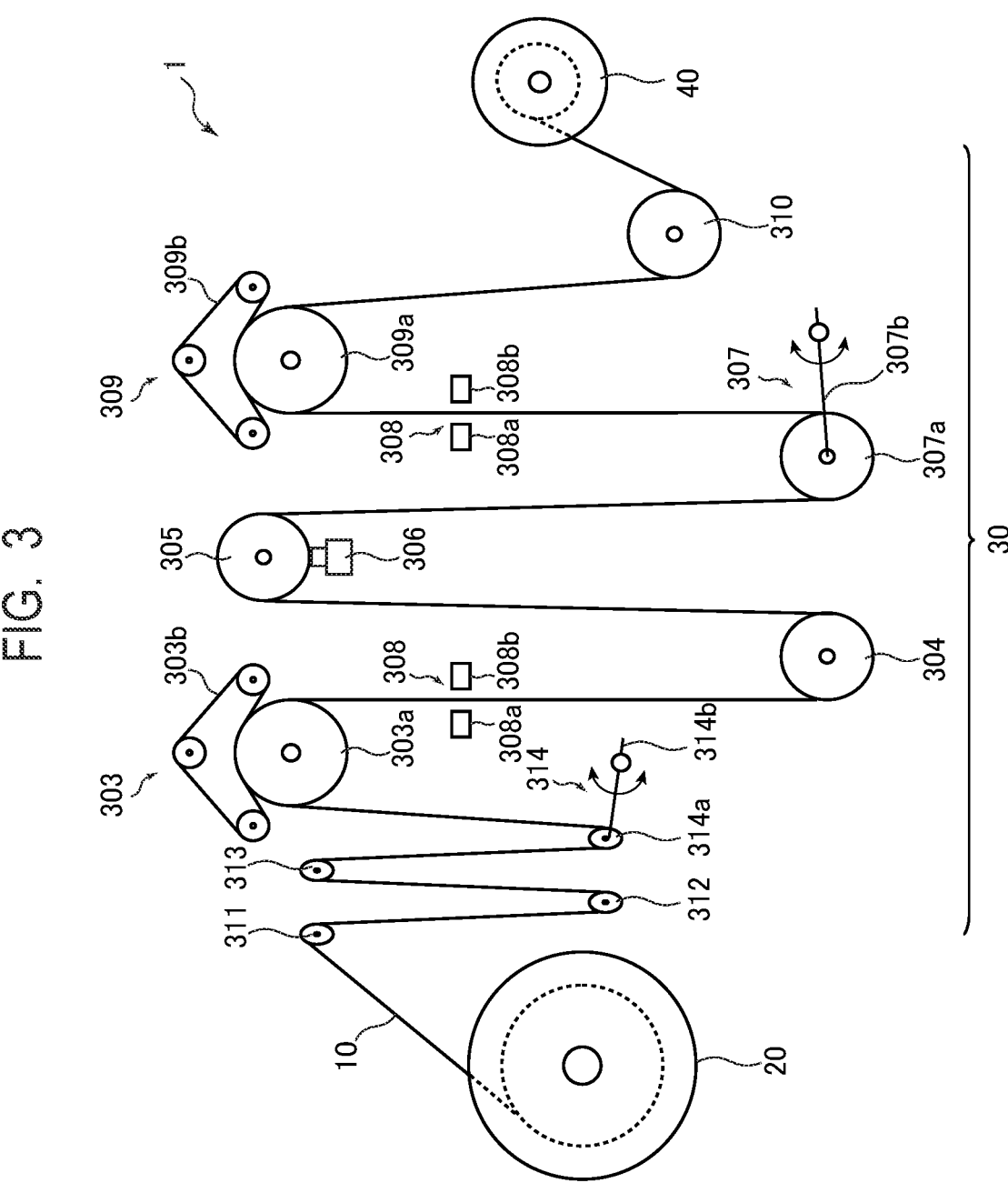
FIG. 3 is a schematic diagram illustrating a screening apparatus for the optical fiber according to a second embodiment of the present invention.
Figure 4:
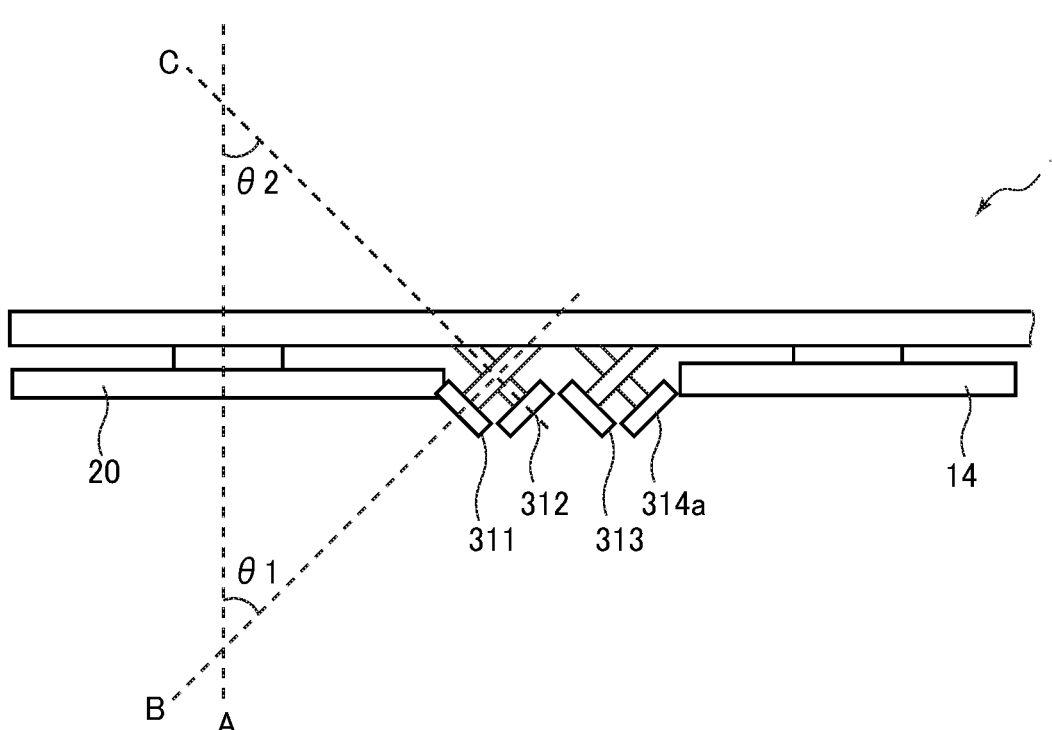
FIG. 4 is a top view diagram illustrating the screening apparatus for the optical fiber according to the second embodiment of the present invention.

A screening apparatus 1 for an optical fiber 10 and a screening method for the optical fiber 10 according to a second embodiment for the present invention will be described by using FIGS. 3 and 4. FIG. 3 is a schematic diagram illustrating the screening apparatus 1 for the optical fiber 10 according to the present embodiment. FIG. 4 is a top view diagram illustrating the screening apparatus 1 for the optical fiber 10 according to the present embodiment. Note that the same components as those in the screening apparatus 1 for the optical fiber 10 and the screening method for the optical fiber 10 according to the first embodiment described above are labeled with the same reference numerals, and the description thereof will be omitted or simplified.

The basic configuration of the screening apparatus 1 for the optical fiber 10 according to the present embodiment is substantially the same as the configuration of the screening apparatus 1 for the optical fiber 10 according to the first embodiment. The screening apparatus 1 for the optical fiber 10 according to the present embodiment is different from the screening apparatus 1 for the optical fiber according to the first embodiment in that the rotation axis of the small-diameter pulley provided between the feeding bobbin 20 and the first capstan 303 is inclined with respect to the rotation axis of the feeding bobbin 20.

As illustrated in FIG. 3, a pulley 311, a pulley 312, a pulley 313, and a pulley 314a, which are small-diameter pulleys, are included between the feeding bobbin 20 and the first capstan 303. The pulley 314a is a pulley of the feeding dancer 314. The feeding dancer 314 has a rod-shaped support 314b on which a pulley 314a is rotatably attached at the tip. A base portion of the support 314b has a rotary axis parallel to the rotation axis of the pulley 314a, and the support 314b can revolve about the rotary axis. The pulley 314a moves up and down by the rotation of the support body 302b. In the present embodiment, the diameter of the small-diameter pulley is 30 mm, and the diameter of the other normal pulleys is 100 mm.

The pulley 311, the pulley 312, the pulley 313, and the pulley 314a are arranged so that the inclination directions thereof are alternately changed with respect to the side surface of the feeding bobbin 20. Thereby, in a top view, the conveyance path of the optical fiber 10 between the feeding bobbin 20 and the first capstan 303 is zigzag. A rotation axis of the pulley 311 is in parallel to the rotation axis of the pulley 313. A rotation axis of the pulley 312 is in parallel to the rotation axis of the pulley 314a.

As illustrated in FIG. 4, a rotation axis B of the pulley 311 is inclined at a predetermined inclination angle θ1 with respect to a rotation axis A of the feeding bobbin 20. Similarly, a rotation axis C of the pulley 312 is inclined at a predetermined inclination angle θ2 with respect to the rotation axis A of the feeding bobbin 20. Although θ1 and θ2 are set to 45 degrees in the present embodiment, the inclination angles are not limited thereto. That is, the inclination angle can be freely changed.

The optical fiber 10 fed out from the feeding bobbin 20 is wound around the pulley 311, the pulley 312, the pulley 313, and the pulley 314a in this order, and then fed out to the first capstan 303.

As described above, according to the present embodiment, between the feeding bobbin 20 and the first capstan 303, the four small-diameter pulleys are provided so that the rotation axis of the small-diameter pulley is inclined with respect to the rotation axis of the feeding bobbin 20. Thereby, the optical fiber 10 contacts the pulley on different surfaces for each pulley. That is, since the surface affected by the bending increases, the breaking of the optical fiber 10 in which the strength deterioration occurs becomes easy even if the foreign matter exists in any positions in the radial direction of the optical fiber 10.

Third Embodiment

Figure 5:
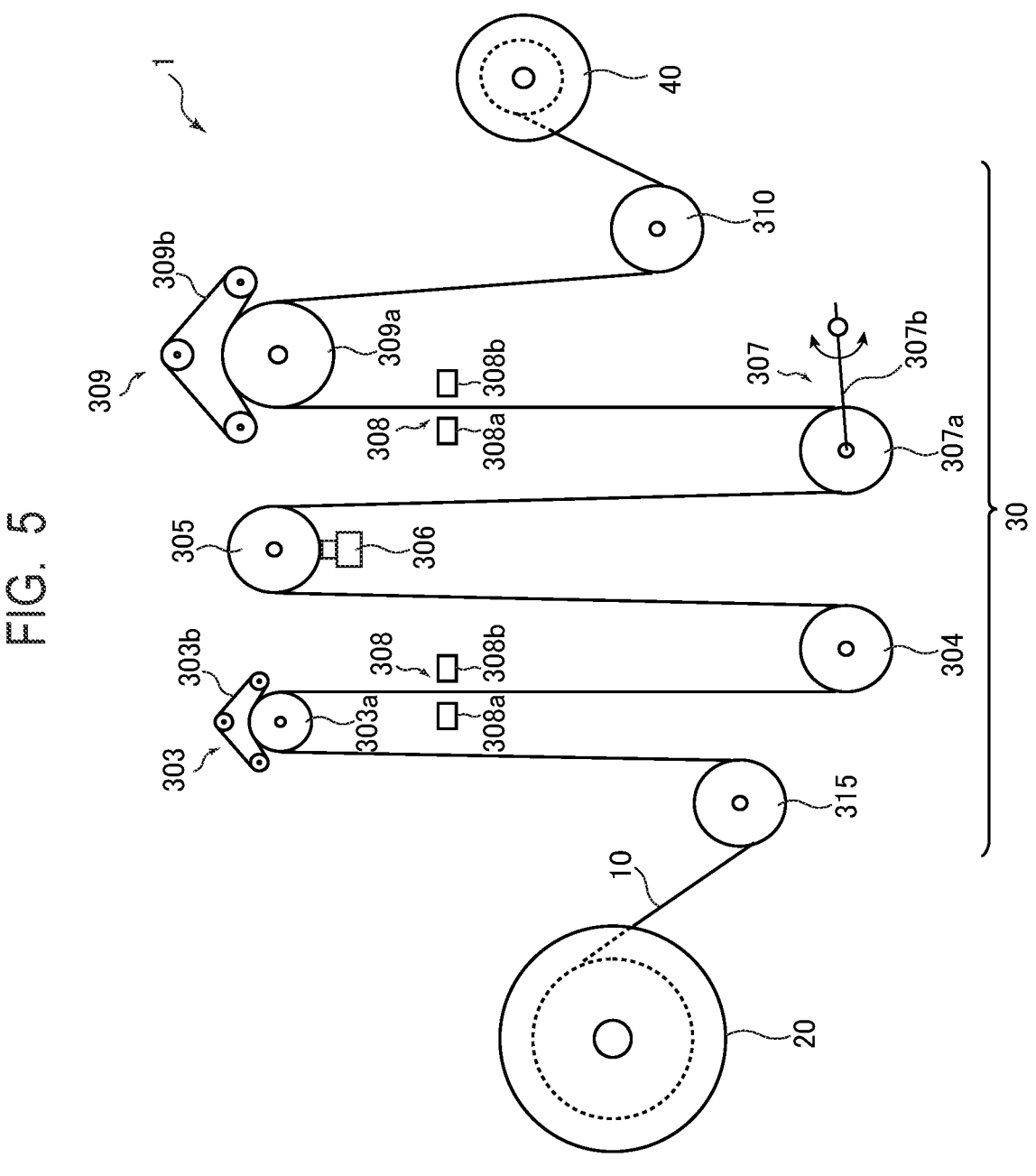
FIG. 5 is a schematic diagram illustrating a screening apparatus for the optical fiber according to a third embodiment of the present invention.

A screening apparatus 1 for an optical fiber 10 and a screening method for the optical fiber 10 according to a third embodiment for the present invention will be described by using FIG. 5. FIG. 5 is a schematic diagram illustrating the screening apparatus 1 for the optical fiber 10 according to the present embodiment. Note that the same components as those in the screening apparatus 1 for the optical fiber 10 and the screening method for the optical fiber 10 according to the first embodiment described above are labeled with the same reference numerals, and the description thereof will be omitted or simplified.

In the first and second embodiments described above, the case has been described in which the diameter of a part of the pulleys among the plurality of pulleys provided in the tension application unit 30 is smaller than the diameter of the other normal pulleys. On the other hand, the present embodiment is different from the first and second embodiments in that the diameters of the plurality of pulleys are the same, and the diameter of the first capstan roller 303a (first capstan 303) is made smaller than the diameter of the second capstan roller 309a (second capstan 309) arranged on the downstream side.

In the present embodiment, the diameter of the first capstan roller 303a is set to 15 mm. The diameter of the second capstan roller 309a is 100 mm. The diameter of the first capstan roller 303a is smaller than the diameters of the pulleys 315, 304, 305 and 307a and 310. The diameter of the second capstan roller 309a may be larger or smaller than a plurality of normal pulleys. The number of types of diameters of the rotating member around which the optical fiber 10 is wound may be even greater.

The first capstan 303 includes a first capstan roller 303a and a rotatable first endless belt 303b. A first endless belt 303b is pressed against the first capstan roller 303a. The first endless belt 303b rotates in a direction opposite to the rotation direction of the first capstan roller 303a as the first capstan roller 303a rotates. The optical fiber 10 is fed by rotation of the first capstan roller 303a while being sandwiched between the first capstan roller 303a and the first endless belt 303b.

Similarly, the second capstan 309 includes a second capstan roller 309a and a rotatable second endless belt 309b. The optical fiber 10 is fed out by rotation of the second capstan roller 309a while being sandwiched between the second capstan roller 309a and the first endless belt 303b.

However, the diameter of the first capstan roller 303a is smaller than the diameter of the second capstan roller 309a. Therefore, in the first capstan 303 and the second capstan 309, the bending angle and the contact area at the time of sandwiching the optical fiber 10 are largely different.

Thus, according to the present embodiment, since the diameter of the first capstan roller 303a is smaller than the diameter of the second capstan roller 309a, it is possible to apply tension while bending the optical fiber 10 at different angles. Thereby, the optical fiber 10 in which the strength degradation occurs is further easily broken.

Other Embodiments

The control unit 70 of the screening apparatus 1 according to the embodiments described above can be implemented based on a control program that is a computer program executed by a processor such as a CPU of a programmable logic controller and other computer devices. Such a control program can be created as a program that causes a processor of a computer device to execute steps implementing each operation and each process described in the above embodiments. A part or whole of the control program can be provided by a computer readable storage medium which stores the part or whole of the control program. Such a storage medium may be, for example, a digital versatile disc-read only memory (DVD-ROM), a compact disc-read only memory (CD-ROM), Universal Serial Bus (USB)

memory, other flash memory, or the like. Further, a part or whole of the control program can be provided via a network.

Modified Embodiment

The present invention is not limited to the embodiments described above, and various modifications are possible.

For example, while the apparatus configuration having a predetermined number of pulleys and dancers illustrated in FIG. 1 has been described as an example for the screening apparatus 1 in the above embodiments, the number of pulleys and the number of dancers are not limited to the case illustrated in FIG. 1. The number of pulleys and the number of dancers can be changed as appropriate.

Further, in the above-described embodiment, examples of the diameter values of the small-diameter pulley, the small diameter capstan roller, and the normal pulley are shown, but the diameter values are not limited thereto. The tension application unit 30 may satisfy the following conditions: (A) the diameter of the small-diameter pulley is smaller than the diameter of the normal pulley, or (B) the diameter of one capstan is smaller than the diameter of the other capstan. The diameter of each rotating member can be freely changed. When the diameter of the small-diameter pulley (first pulley) is smaller than the diameter of the normal pulley (second pulley), the diameter of the small-diameter pulley may be less than 100 mm. Further, when the diameter of one capstan is smaller than the diameter of the other capstan, the diameter of the small-diameter capstan may be less than 100 mm.

For example, in the above-described embodiment, the diameter of the small-diameter pulley is generally 30% or less of that of the pulley. For example, the diameter of the small-diameter pulley is preferably equal to or smaller than half the diameter of the normal pulley. Similarly, the diameter of one capstan may be set to half or less the diameter of the other capstans.

When the diameter of the small-diameter pulley (first pulley) is smaller than the diameter of the normal pulley (second pulley), the diameter of the small-diameter pulley may be set to 15 mm or more and less than 30 mm. Similarly, when the diameter of one capstan is smaller than the diameter of the other capstan, the diameter of the small-diameter capstan may be set to 15 mm or more and less than 30 mm.

Further, in the above embodiments, the case where servomotors 52, 54, 58, and 60 are used as motors that rotary-drive the feeding bobbin 20, the first capstan 303, the second capstan 309, and the winding bobbin 40 has been described as an example. However, the motors that rotary-drive the feeding bobbin 20, the first capstan 303, the second capstan 309, and the winding bobbin 40 are not limited to a servomotor, and various motors can be used.

Further, while the case where a screening test is performed for the optical fiber 10 has been described as an example in the above embodiments, the present invention can be widely applied to screening tests that test a tensile strength performance of a linear member such as a wire, a cable, a power line, or the like other than an optical fiber.

What is claimed is:

1. A screening apparatus for an optical fiber comprising:
   a feeding unit that feeds out an optical fiber;
   a tension application unit that applies a tension to the optical fiber fed out from the feeding unit; and
   a winding unit that winds the optical fiber to which the tension is applied by the tension application unit;
   wherein the tension application unit includes a first pulley, a second pulley, a first capstan, and a second capstan,
   a diameter of the first pulley is smaller than a diameter of the second pulley, or a diameter of the first capstan is smaller than a diameter of the second capstan,
   wherein, based on a difference between the diameters of the first pulley and the second pulley, or between the diameters of the first capstan and the second capstan, the optical fiber is subjected to different bending angles while the tension is applied.

2. The screening apparatus for the optical fiber according to claim 1, wherein when a diameter of the first pulley is smaller than a diameter of the second pulley, the first pulley is located upstream of the second pulley, the first capstan, and the second capstan in a direction in which the optical fiber is conveyed.

3. The screening apparatus for the optical fiber according to claim 2, wherein the rotation axis of the first pulley is inclined with respect to a rotation axis of the feeding unit.

4. The screening apparatus for the optical fiber according to claim 2, wherein the first pulley has a diameter that is less than 100 mm.

5. The screening apparatus for the optical fiber according to claim 4, wherein the first pulley has the diameter that is 15 mm or more and less than 30 mm.

6. The screening apparatus for the optical fiber according to claim 1, wherein when a diameter of the first capstan is smaller than a diameter of the second capstan, the diameter of the first capstan is less than 100 mm.

7. The screening apparatus for the optical fiber according to claim 6, wherein the diameter of the first capstan is 15 mm or more and less than 30 mm.

8. The screening apparatus for the optical fiber according to claim 1, wherein a plurality of the first pulleys is provided.

9. A screening method for an optical fiber comprising:
   feeding out an optical fiber from a feeding unit;
   by using a tension application unit, applying a tension to the optical fiber fed out from the feeding unit; and
   by using a winding unit, winding the optical fiber to which the tension is applied by the tension application unit,
   wherein the tension application unit includes a first pulley, a second pulley, a first capstan, and a second capstan,
   a diameter of the first pulley is smaller than a diameter of the second pulley, or a diameter of the first capstan is smaller than a diameter of the second capstan,
   wherein, based on a difference between the diameters of the first pulley and the second pulley, or between the diameters of the first capstan and the second capstan, the optical fiber is subjected to different bending angles while the tension is applied.

\* \* \* \* \*